United States Patent
Anders et al.

(10) Patent No.: US 10,402,652 B2
(45) Date of Patent: Sep. 3, 2019

(54) BUILDING BLACK BOX

(71) Applicant: International Business Machines Corporation, Armonk, NY (US)

(72) Inventors: Kelley L. Anders, East New Market, MD (US); Jeremy R. Fox, Georgetown, TX (US); Grant D. Miller, Arvada, CO (US)

(73) Assignee: International Business Machines Corporation, Armonk, NY (US)

( * ) Notice: Subject to any disclaimer, the term of this patent is extended or adjusted under 35 U.S.C. 154(b) by 99 days.

(21) Appl. No.: 15/612,157

(22) Filed: Jun. 2, 2017

(65) Prior Publication Data

US 2018/0348018 A1 Dec. 6, 2018

(51) Int. Cl.
| | | |
|---|---|---|
| *G06K 9/00* | (2006.01) | |
| *G01D 21/00* | (2006.01) | |
| *G01L 5/00* | (2006.01) | |
| *B64D 45/00* | (2006.01) | |

(52) U.S. Cl.
CPC ......... *G06K 9/00704* (2013.01); *G01D 21/00* (2013.01); *B63B 2201/26* (2013.01); *B64D 2045/0065* (2013.01); *G01L 5/0052* (2013.01)

(58) Field of Classification Search
CPC ............... G06K 9/00704; G01D 21/00; B63B 2201/26; B64D 2045/0065; G01L 5/0052; G01V 1/008; G08B 25/016; G08B 25/10
USPC ........................................................ 382/159
See application file for complete search history.

(56) References Cited

U.S. PATENT DOCUMENTS

| | | | | |
|---|---|---|---|---|
| 4,148,019 A | * | 4/1979 | Durkee | G08B 25/00 340/521 |
| 6,792,720 B2 | * | 9/2004 | Hocking | E02D 3/11 405/302.4 |
| 9,374,673 B2 | | 6/2016 | Mendelson | |
| 2005/0017873 A1 | * | 1/2005 | Liu | G01M 5/0008 340/870.01 |
| 2011/0130636 A1 | * | 6/2011 | Daniel | G08B 25/016 600/301 |
| 2017/0350788 A1 | * | 12/2017 | Blemel | G01M 11/319 |
| 2018/0136085 A1 | * | 5/2018 | Lochry | G01M 99/004 |

(Continued)

FOREIGN PATENT DOCUMENTS

| | | |
|---|---|---|
| CN | 202012225 | 10/2011 |
| CN | 103559774 | 2/2014 |
| CN | 105389806 | 3/2016 |

(Continued)

OTHER PUBLICATIONS

Mell et al., "the NIST Definition of Cloud Computing," Recommendations of the Naitonal Institute of Stanards and Technology, pp. 1-7 (Sep. 2011).

*Primary Examiner* — Ali Bayat
(74) *Attorney, Agent, or Firm* — Peter K. Suchecki

(57) ABSTRACT

A system and computer-implemented method include a wireless network hub configured to forward received sensor readings to a sensor analysis system. One or more sensor units coupled to the wireless network hub and affixed to a structure are configured to wirelessly transmit data to the wireless network hub at a first time frequency, and, in response to a detected danger to the structure, wirelessly transmit sensor readings to the wireless network hub at a second time frequency greater than the first time frequency.

6 Claims, 11 Drawing Sheets

(56) References Cited

U.S. PATENT DOCUMENTS

2018/0139517 A1* 5/2018 Schwartz ................ H04Q 9/00

FOREIGN PATENT DOCUMENTS

| JP | 209046287 | 3/2009 |
| JP | 2009046287 A | 3/2009 |
| JP | 5908160 | 4/2016 |
| JP | 60646784 | 11/2016 |
| JP | 6046784 B1 | 12/2016 |

* cited by examiner

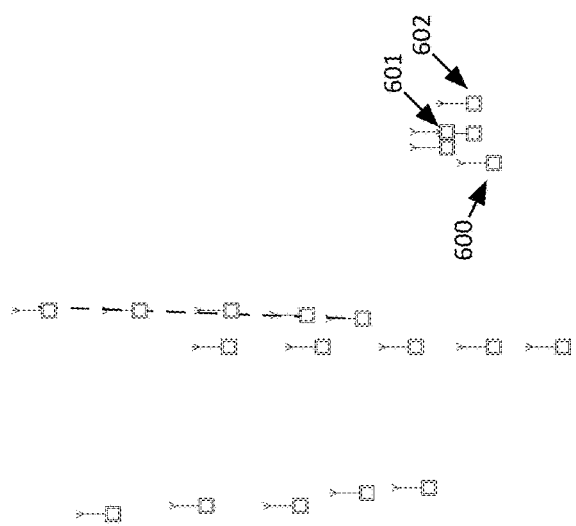
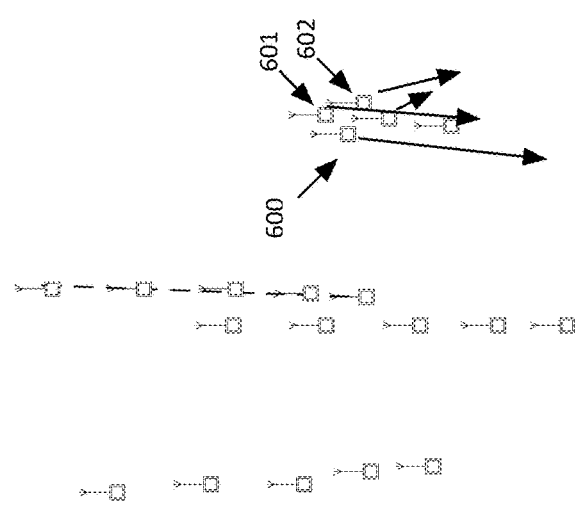
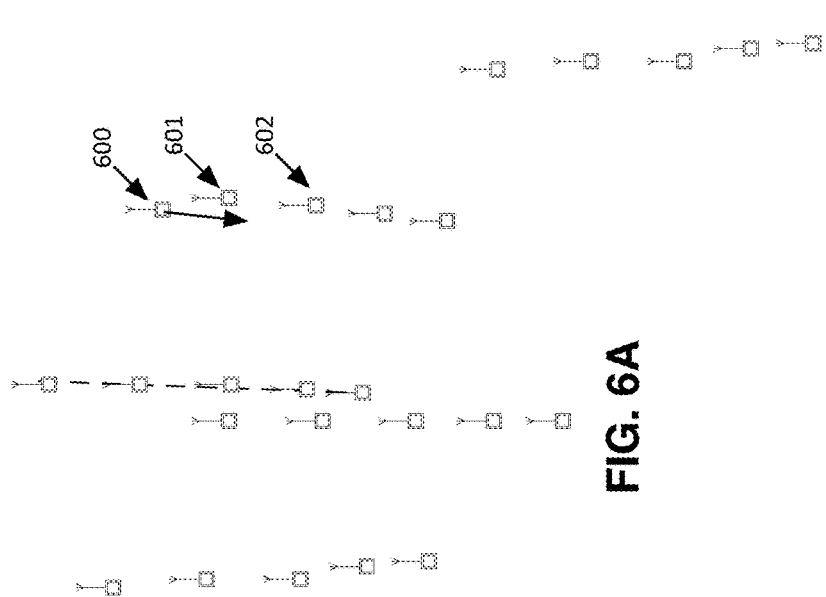
FIG. 6C
FIG. 6B
FIG. 6A

BUILDING BLACK BOX

FIELD OF INVENTION

This disclosure relates to systems and methods for disaster recovery and analysis, and more specifically, to systems and methods for gathering data during a building collapse and using the gathered data for search and rescue missions or improved architectural designs.

BACKGROUND

Whenever an airliner crashes, investigators often look for a "black box," a well-shielded recording device that stores cockpit voice recordings and information about the airplane's components, in order to reconstruct the final moments before the disaster. Recovered data from the black box is used by investigators to help determine whether the cause of the disaster was pilot error, mechanical failure, military or terrorist action, or some other cause.

Office buildings and apartment buildings, despite often having similar value to airliners both economically and in numbers of human lives at risk, typically lack any similar standard system and operating procedure for obtaining and analyzing data after a fire, natural disaster, or other significant damage to a building. The lack of adequate, real-time, reliable data makes search and rescue operations very difficult for first responders. First responders and other emergency personnel often have little or no information regarding how a building has been damaged or collapsed as a result of, for example, an earthquake or natural disaster.

SUMMARY

In accordance with one aspect of this disclosure, a system includes a wireless network hub, one or more sensor units coupled to the wireless network hub, and a sensor analysis system. The one or more sensor units are affixed to a structure and configured to wirelessly transmit data to the wireless network hub at a first time frequency or cadence (collectively referred to herein as "frequency"), and, in response to a detected danger to the structure, wirelessly transmit sensor readings to the wireless network hub at a second time frequency greater than the first time frequency. The sensor analysis system is configured to receive location data concerning the structure; receive, from the one or more sensor units and via the wireless network hub, the wirelessly transmitted sensor readings; and generate a three-dimensional model of the structure based at least in part on the location data and the sensor readings.

In accordance with another aspect of this disclosure, a computer-implemented method is disclosed for aiding search-and-rescue. Location data regarding a structure is stored. A data transmission is received at a first time frequency from one or more sensor units affixed to the structure. In response to a detected danger to the structure, sensor readings are received from the one or more sensor units at a second time frequency greater than the first time frequency. A model of the structure is generated based on the received sensor readings to determine damage caused by the detected danger.

In accordance with another aspect of this disclosure, a sensor unit is disclosed, including a processor, a communications interface, one or more sensor modules, and non-transitory memory. When executed by the processor, instructions stored in the non-transitory memory cause the sensor unit to record sensor readings from the one or more sensor modules at a first time frequency, and determine that a danger exists to a structure the sensor unit is affixed to. In response to the determination, sensor readings from the one or more sensor modules are recorded at a second time frequency greater than the first time frequency and the recorded sensor readings are transmitted to a sensor analysis system.

BRIEF DESCRIPTION OF THE DRAWINGS

FIGS. 6A-6C illustrate, in simplified form, example visualizations that can be generated from snapshots of the four-dimensional model according to the method illustrated in FIG. 5;

DETAILED DESCRIPTION

The lack of adequate, real-time, reliable data for search and rescue operations highlighted above may be addressed by installing a system of sensors throughout a structure to provide detailed data on the current and historical state of the structure. As a result, first responders or other interested parties may be able, even before arriving at the scene of an emergency, to determine information such as (but not limited to) the cause of an emergency, what parts of a structure may still be standing and functional, what parts of a structure are safe or what safety equipment may be necessary to render those parts safe, where survivors are likely to have come to rest, where rubble may have built up, and so on. Sensor data may be analyzed to provide real-time, three-dimensional views or simulations of the structure, as well as four-dimensional views (adding time as the fourth dimension to an otherwise static three-dimensional model), such as, for example, an animation or explorable virtualization of the structure throughout its collapse. Other entities such as insurers, engineers, law enforcement, and construction companies may find the current or historical structural data invaluable for analysis or prediction of future responses to structural damage in similar structures.

Figure 1:
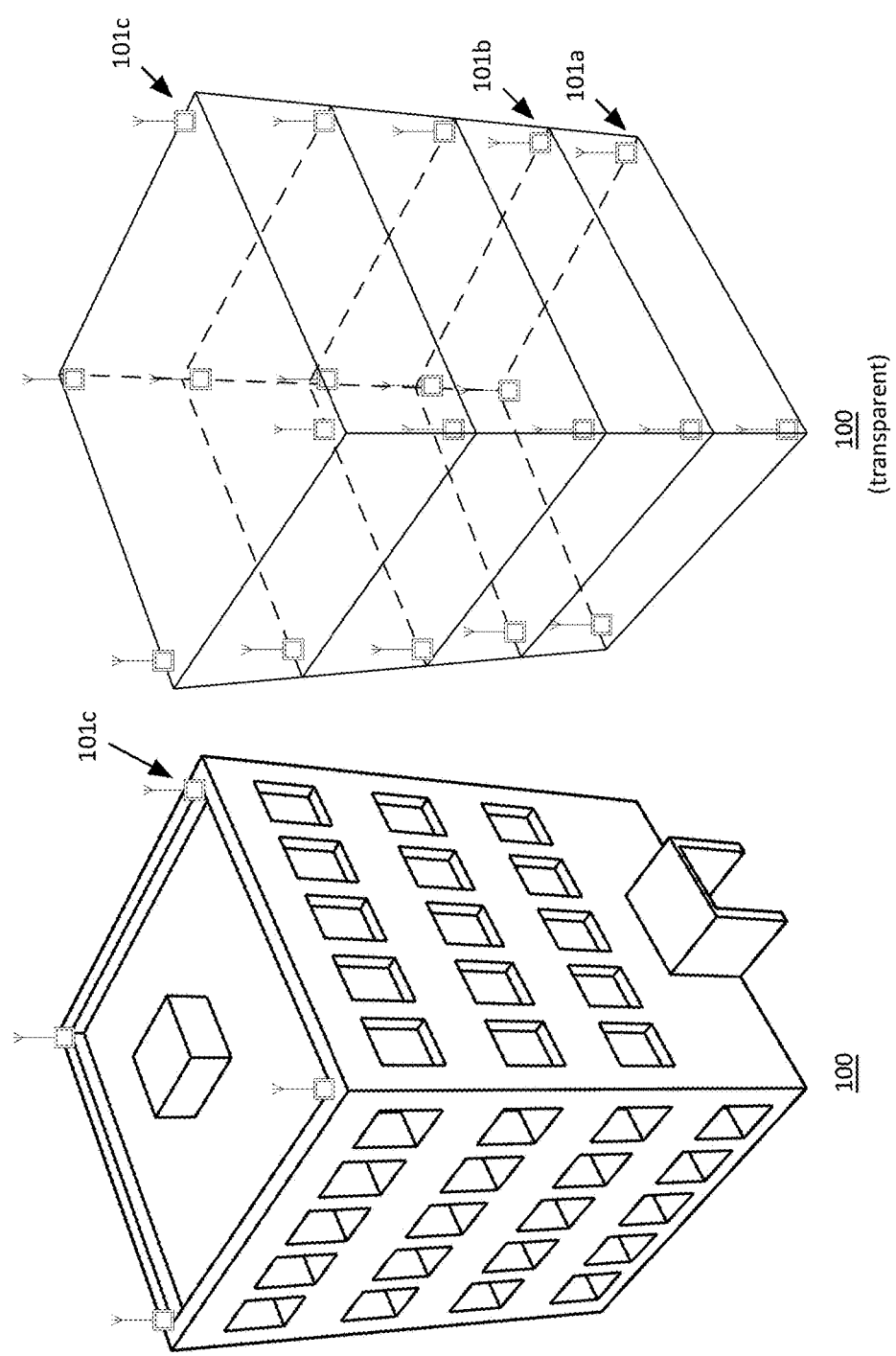
FIG. 1 illustrates, in simplified form, a system of sensors deployed in a building.

With reference now to FIG. 1, a structure 100 may have one or more sensor units 101*a*, 101*b*, 101*c*, . . . 101*n* placed throughout it. Sensor units 101a-101n may preferably be placed on a number of different floors of the building 100 and at a number of different locations within those floors, in order to maximize potential information received about any change, especially a movement in the structure itself, in any part of the building. Sensor units 101a-101n may optionally be placed on the roof, in a basement/crawlspace, or on outer walls, as opposed to or in addition to within floors of the building 100. Sensor units within the building 100 may be placed near critical locations, such as (but not limited to) stairwells, elevator shafts, load-bearing columns or walls, rooms that are typically inhabited or occupied by persons (e.g., offices, hotel rooms, bedrooms, apartments, etc.), rooms containing items of significant economic or sentimental value, or exits. Alternatively, sensor units 101a-101n may be placed at extremities of each floor of building 100, as illustrated in FIG. 1, or spaced at regular intervals within a given floor in a given grid or lattice pattern.

For example, FIG. 1 illustrates a four-story building 100, with four sensor units 101 placed on every floor and the roof, at the four corners of each floor. One sensor unit 101a is placed on the ground floor, another sensor unit 101b is placed on the second floor, and a third sensor unit 101c is placed on the roof of the building. In some embodiments, sensor units 101 may be placed at the same locations on each floor, as illustrated in FIG. 1, such that sensor units will be aligned vertically throughout the building. In other embodiments, sensor units 101 may be placed in different layouts or patterns on each floor, especially if different floors have different architectures, rooms, purposes, or elements mentioned above as critical for reasons of structural importance, human safety, or economic value.

In alternative embodiments, rather than a structure 100, the sensor units 101 could be distributed throughout a temporary erection (such as, for example, a circus tent, outdoor stage, or carnival ride), a building that is under construction (in which case sensors are added as new floors/areas are added to the structure in which the sensor units can be placed, and may remain after construction or be removed when construction is complete), a vehicle having sufficient scale to be treated as a structure (e.g., a ship, oil rig, artificial island, space station, satellite, etc.), or a natural structure or artificial structure that interfaces with a natural geographic feature (e.g., a cave, mineshaft, cliff face, canyon, dam, levee, etc.).

Figure 2:
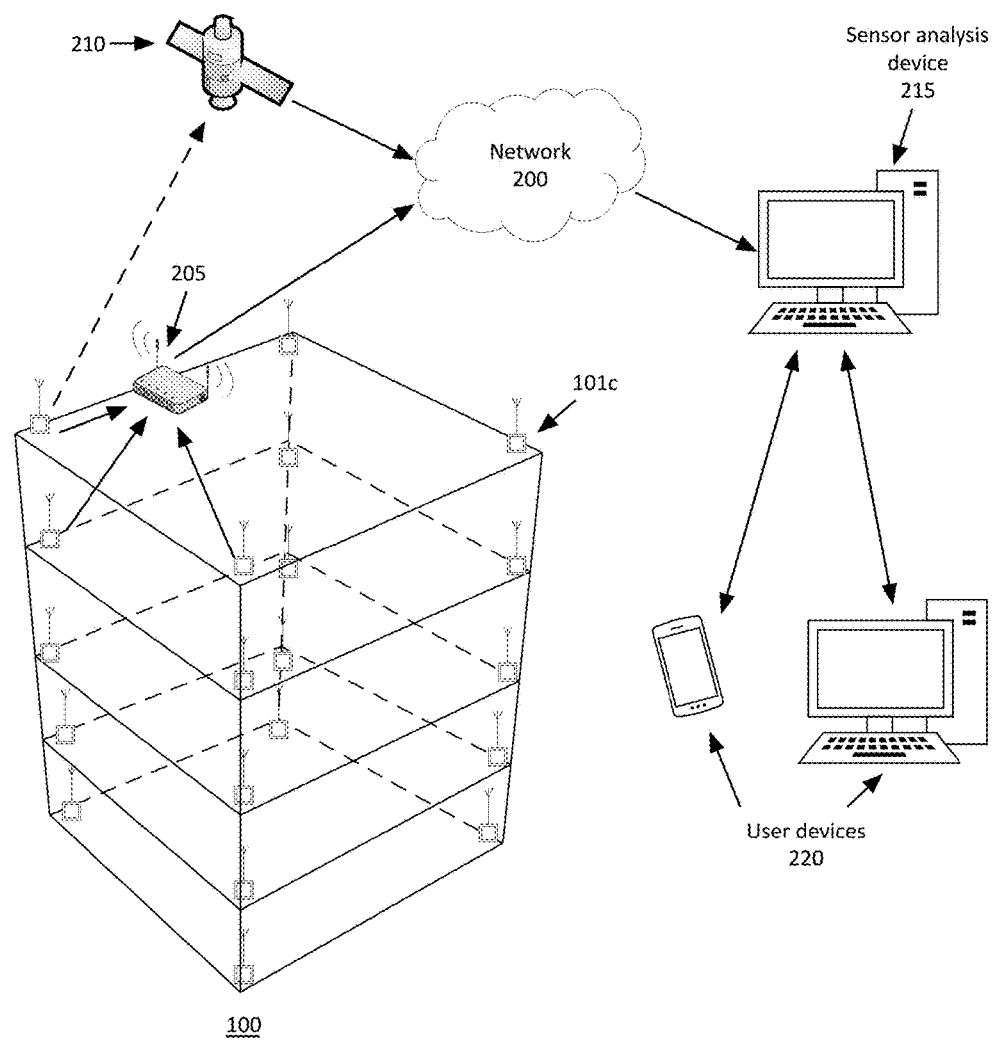
FIG. 2 illustrates, in simplified form, a system for transmitting and receiving data from the system of sensor units illustrated in FIG. 1.

FIG. 2 illustrates, in simplified form, a system for transmitting and receiving data from the system of sensor units 101 illustrated in FIG. 1.

With reference now to FIG. 2, each of the sensor units 101 is preferably configured to communicate via a wireless network with a base station 205. The base station 205 may be a dedicated router handling networking for only the sensor units 101 and with optimized protocols or frequencies for communication with the sensor units, or alternatively may be a generic wireless router that also handles routing of internet routing of other communications devices. The base station 205 may be installed either in the structure 100 itself (which may provide a greater signal strength between the base station and sensor units) or may be placed nearby outside the structure 100 (which increases the likelihood of the base station 205 surviving a collapse of the structure 100 to continue forwarding data from surviving sensor units 101). A wireless network structure is preferred to enable functioning during a structural collapse that would likely sever physical wired connections, but even a solely wired connection would be able to send and receive useful data before wired connections are severed as a result of a collapse or in the fortuitous case that the connections are not severed.

In an alternative embodiment, the sensor units 101 may communicate with another external communications device, such as, for example, satellite 210 or another communications device not communicating via standard wireless internet means.

In some embodiments, all sensor units 101 may communicate only directly with the base station 205 or other forwarding communications device, using a hub-and-spoke style network structure. In other embodiments, the sensor units 101 may be capable of establishing a mesh network to enable sending data from sensor units outside the range of the base station 205 to sensor units inside the range of the base station, which then forward the data to the base station.

Data from the sensor units 101 are forwarded via base station 205 or external communications device 210 through a network 200 to a data analysis device 215. The data analysis device 215 uses the data to generate visualizations of the past and current status of the sensor units (described in further detail in FIG. 5, below), and forwards visualization information to one or more user devices 220. The user devices 220 may be, for example, mobile computing devices held by first responders or law enforcement, or computing devices used by engineers or insurers to view and assess a structural collapse for educational and predictive purposes.

Figure 3:
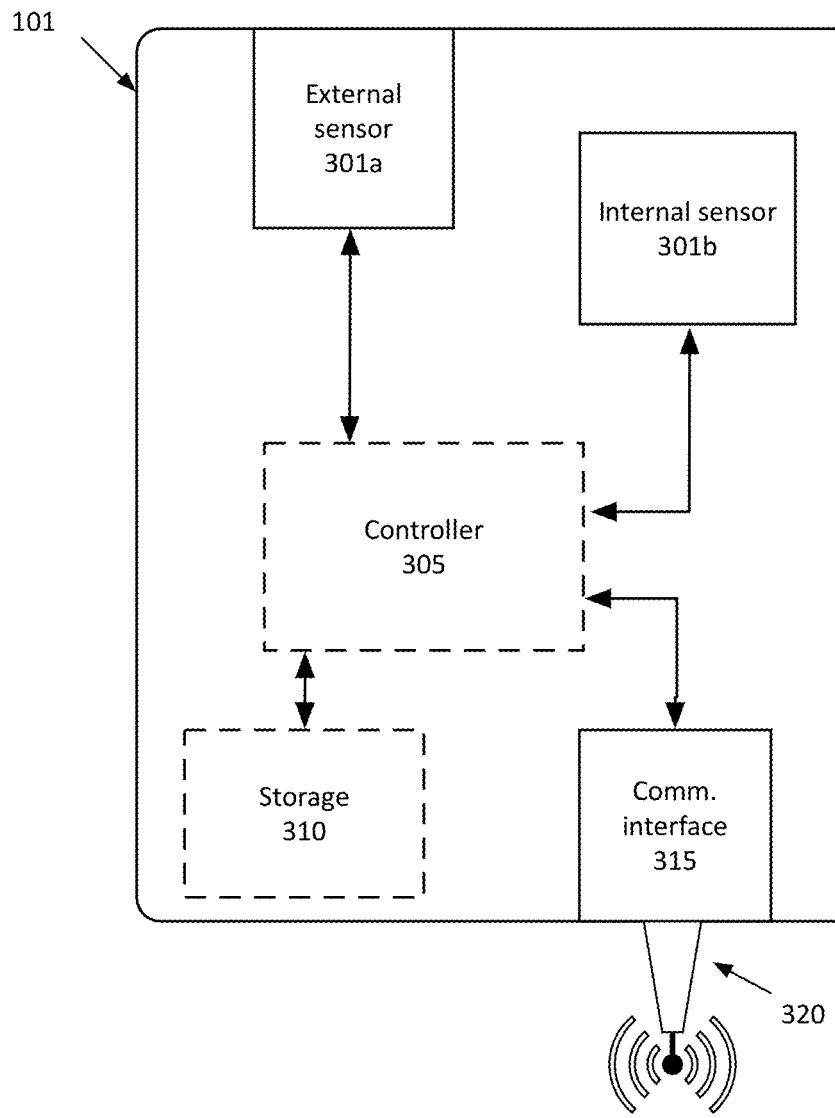
FIG. 3 illustrates, in simplified form, a representative sensor to be used in the system and methods disclosed herein.

FIG. 3 illustrates, in simplified form, a representative sensor unit 101 to be used in the system and methods disclosed herein.

With reference now to FIG. 3, a sensor unit 101 includes a communications interface 315, which is preferably used to wirelessly transmit data to—and optionally wirelessly receive data from—one or more of the base stations 205 or sensor analysis device 215. In an alternative embodiment, sensor 101 may be incapable of wireless transmission, and rely on being recovered and a wired data transfer protocol being used to receive stored data.

Sensor unit 101 also includes one or more sensor modules 301a, 301b, ... 301n, which may include, for example, any one or more of an accelerometer, an altimeter, a global positioning service (GPS) receiver or other sensor capable of determining a current position, a gravimeter, a gyroscope or other sensor capable of determining a current orientation, a thermometer, a microphone, a photosensor, an external pressure sensor, a sensor for detecting an absence or presence of a gas (including oxygen, methane, natural gas, smoke, carbon monoxide, carbon dioxide, etc.), a sensor for detecting an absence or presence of a liquid (including water, oil, gasoline, acid, etc.), or a sensor for detecting electric currents in water or other electromagnetic phenomena.

The sensor modules 301a-301n may be located internally or have external vents or sensing components, according to the needs of each sensor module. For example, an accelerometer (or other internal sensor 301b) can sense changes in movement of the sensor while completely encased in a protective shield, while a thermometer or air quality sensor module (or other external sensor 301a) will typically require an external contact point on the surface of the sensor that cannot be completely shielded without interfering with sensor readings.

In some systems, a single sensor unit configuration (incorporating multiple sensor modules) is used in every sensor unit 101 throughout the system. In others, the use of multiple configurations may allow incorporating the most appropriate sensor modules for a given sensor unit's location. For example, a sensor unit 101 incorporating a moisture sensor is best placed in the basement of a building 100 to monitor for flooding, but may not need an accelerometer, as the basement would likely not move during a collapse; the reverse is true of a sensor unit placed on the roof of a building. In another example, sensor units 101 incorporating thermometers or methane sensors may be placed near a gas main in a building to determine if and when it has ruptured, but the same sensors may be less useful at other locations in a building.

The sensor modules 301a-301n are, in some variants, coupled to a controller 305. The controller 305 will typically be an integrated circuit with hard-wired functionality or a processor programmed to perform the functions described herein by executing instructions stored in a non-transitory storage 310. The controller 305 executes instructions to cause the sensor modules 301a-301n to take readings relating to the sensor itself or the environment around the sensor, to receive raw data or summary information from the sensor modules 301a-301n, and optionally to analyze the received data or information to determine whether a potential danger to a structure 100, such as an earthquake or fire, may exist.

The controller 305 may cause the sensor modules 301a-301n to take a sensor reading at a particular frequency (e.g., number of sensor readings in a given period of time) or cadence (e.g., repeating pattern of sensor readings over a given period of time). As used herein, the term "frequency" is understood to collectively refer to either the number of sensor readings in a given period of time or a repeating pattern or a pattern of sensor readings over a given period of time. For example, in some versions, the controller 305 causes the sensor modules 301a-301n to take a sensor reading at a frequency of greater than once per millisecond; in others, it may be a frequency of greater than once per second, or greater than once per minute, and may be on a regular or irregular clock cycle as appropriate. Alternatively, a particular sensor module 301 may operate such that it sends a signal or is triggered if a threshold is crossed, for example, in response to a determination that the sensor is moving, that the sensor is submerged in water, or that the sensor is in an environment with an abnormally high temperature (for example, 40° C., 100° C., or 200° C.).

In other variants, the controller 305 and non-transitory storage 310 are unnecessary, and the sensor modules 301a-301n are preconfigured to obtain and transmit sensor readings at a given frequency or in response to a threshold being crossed.

The sensor unit 101 also incorporates a communications module 315. The communications module 315 preferably includes a wireless transmitter 320 (for example, a radio transmitter, wireless modem, Wi-Fi transmitter, Bluetooth connection, satellite data connection, etc.), and may optionally include a wired connection (for example, a data bus, modem and phone line, USB (universal serial bus), etc.), or any other means of using a protocol to transmit data to another computing device. The controller 305 preferably uses the communications module 315 to transmit information regarding sensor readings from the sensor modules 301a-301n wirelessly over a wireless internet connection, though a different wireless networking method or a wired network may optionally be used.

In some embodiments of the sensor unit 101, transmissions occur at the same frequency with which sensor readings are taken; in others, they occur less often. For example, summary data for sensor readings taken every millisecond may be sent once every tenth of a second, or once a minute readings may be summarized and transmitted every hour. Summary data may include, for example, an average value over a time period, the maximum and/or minimum values over a time period, or an acknowledgement that sensor data never left a predetermined range of expected values during the time period. Use of summary data may reduce the number of superfluous transmissions by the sensor unit 101, for example by only having temperatures transmitted by those sensor units in a burning building that actively detect elevated temperatures, rather than those on another floor or in another wing of the building, unaffected by a fire.

Storage 310 may optionally store sensor data as it is received from the sensor modules, to allow recovery of the data if the communications interface 315 is destroyed, but the rest of the sensor unit 101 remains intact. Storage 310 may be removable or ejectable from the sensor unit 101 to facilitate this, or there may be an additional wired interface (such as (but not limited to) a USB port or other data port) to allow a computing device coupled to the sensor unit to retrieve data from the storage.

Figure 4:
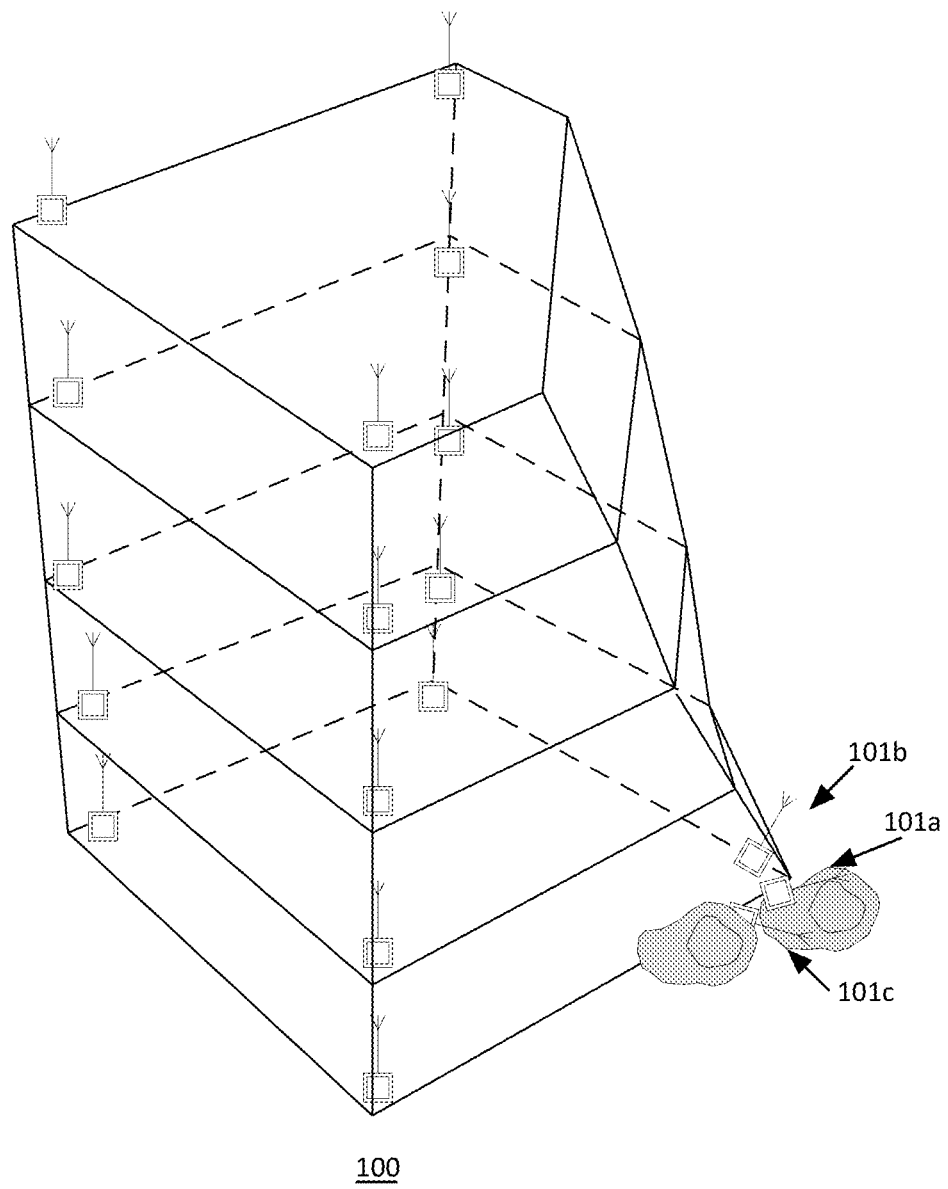
FIG. 4 illustrates, in simplified form, a collapse of a building containing the sensor units illustrated in FIG. 1.

FIG. 4 illustrates, in simplified form, a collapse of a building 100 containing the sensor units 101 illustrated in FIG. 1.

In response to some form of structural damage, such as that caused by an earthquake, fire, explosion, flood, sinkhole, or weakening of foundation or support beams, structure 100 may collapse partially or entirely. During the collapse or directly by the damaging force itself, some or all of sensor units 101 or base station 205 may be destroyed, displaced, buried, or otherwise made inaccessible.

In the example illustration shown in FIG. 4, each of sensor units 101a, 101b, and 101c has changed its position and orientation, and two of the other sensor units in the corner of the building 100 have been destroyed. Sensor units 101a, 101b, and 101c, despite being occluded by rubble, continue to transmit data to base station 205 for forwarding to sensor analysis device 215, enabling the sensor analysis device to plot the current locations of those sensor units and determine that the corner of the structure 100 has collapsed. Depending on what sensor data is transmitted by the sensor units 101 during and after the collapse, the sensor analysis device 215 may be able to generate a detailed model of the moments of the collapse and the current state of the building 100, as shown in the following figure and its description.

Figure 5:
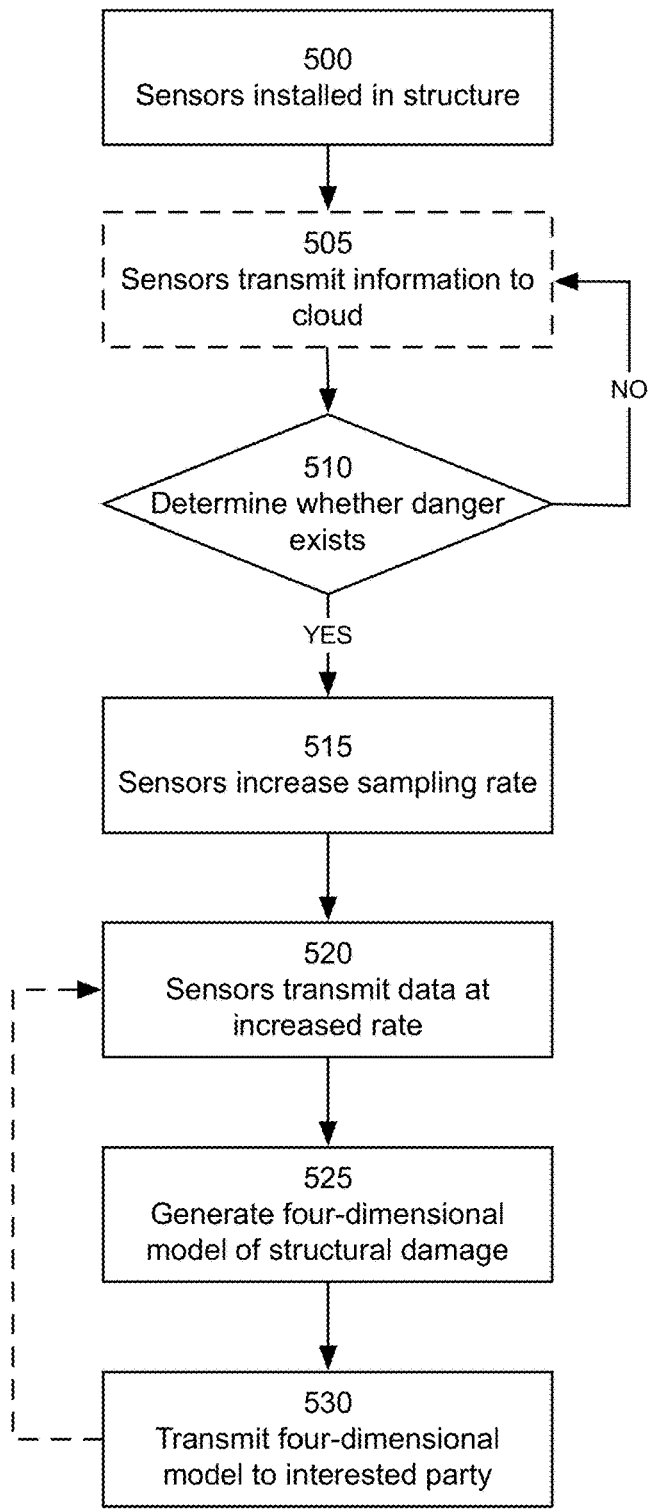
FIG. 5 illustrates a preferred method of using data received during and after a building collapse to learn about the collapse.

FIG. 5 illustrates, in simplified form, a preferred method of using data received during and after structural damage to generate a four-dimensional model of the state of the structure 100 at various points in time.

As described previously regarding FIG. 1, sensor units 101 are placed at one or more locations throughout a structure 100 to be modeled, such as a structure that has been identified as being at risk of future damage (Step 500). As discussed above, the sensor units 101 may be placed at regular intervals, placed in a regular pattern, placed at identified points of possible structural failure, placed at critical points with human life or economic value, placed at extremities of the structure, or placed at any other location(s) within or in proximity to the structure.

After installation, the sensor units 101 begin transmitting sensor readings to the base station 205 at a low time frequency (Step 505). For example, sensor units 101 may have a "heartbeat" signal sent once per minute (or at another time frequency such as, for example, once per second, once per hour, once per day, etc.) to confirm that the sensor is still active and functioning properly. In some embodiments, the sensor units 101 may remain entirely dormant without any signals, or may transmit a single initialization signal at the time of installation to notify the base station 205 of their existence, and then go dormant, or may be dormant except upon receiving a signal from the base station 205 or another computing device requesting verification that they are active, to which the sensor units respond and then return to dormancy.

During this initialization, the transmitted sensor readings may be used to establish a baseline sensor reading for each sensor unit 101, in order to determine an acceptable baseline range of values. For example, a sensor unit 101 in a boiler room may routinely record a temperature of at least 50° C., while a sensor unit in an office space sensing the same temperature may be indicative that a fire has started. Similarly, a sensor unit 101 near industrial equipment may routinely record strong vibrations that are unremarkable, but would likely indicate an earthquake or major structural damage if detected in a different part of a structure 100. A baseline value or baseline range may be stored for each sensor unit 101a, 101b, 101c, . . . 101n, allowing a system or the sensor units themselves to more quickly determine when abnormal conditions are occurring. In alternative embodiments, no baseline values are recorded, and instead a predetermined threshold is used to determine what acceptable sensor values are.

On a regular basis, the sensor units 101 determine whether a danger to the structure 100, or to persons or valuables inside the structure, is detected or predicted (Step 510). Dangers to a structure or to persons or valuables inside the structure may include, as non-limiting examples, an earthquake, avalanche, landslide/mudslide, cave-in, sinkhole, tornado, hurricane, flood, fire, chemical spill, automobile or airplane impact, explosion, damage to a gas main, terrorism, structural weakening or failure, or any other potential cause of collapse, major damage, or risk to life.

The detection of the danger may be performed by the sensor units 101 themselves (e.g., detecting an earthquake by dramatic changes in accelerometer readings, detecting a fire by dramatically increased thermometer readings beyond normal levels, detecting flooding via sensing moisture on multiple sensor units, detecting an unknown but likely danger by significant changes in sensor unit position or acceleration, etc.). In some embodiments, one sensor unit 101 may detect a danger and be able to communicate with the other sensor units of the network to inform them that it has detected the danger, even if those other sensor units are currently unable to sense the danger via their own sensor modules.

Alternatively, the sensor units 101 may receive a signal from outside the network indicating that another device or an individual has detected a danger to the structure. For example, the base station 205 or another intermediary computing device may receive an automated tsunami warning, tornado warning, hurricane warning, earthquake warning, etc., from a national weather service or national seismographic service and automatically forward a notification to the sensor units 101 via a wireless or wired network to which the sensor units are operatively connected. In another example embodiment, a human user may use a software application to transmit a warning to the sensor units 101 that the human believes a danger is imminent (e.g., in response to a bomb threat, or human reports that the structure appears to be shifting, cracking, etc.), or a human may trigger a physical alarm, such as a fire alarm, that may cause a warning signal to be automatically sent to the sensor units.

In response to determining that a danger is occurring— whether receiving the signal indicating detection of a danger of building destruction, or detecting the danger themselves—the sensor units 101 automatically increase the sampling rate or time resolution of data collection (Step 515). For example, if a sensor unit 101 was previously configured to take sensor readings at a rate of once per second, the resolution may be increased to begin taking sensor readings at once every few milliseconds, once per millisecond, or at the highest frequency the sensor units are physically capable of receiving and sending data. The increased sampling rate allows for instant by instant snapshots of the exact state of each sensor unit 101, providing incredibly fine detail for understanding the status of the structure 100 as a whole.

Whether or not the sensor units 101 were transmitting sensor data previously, the sensor units begin transmitting the sensor data at the increased rate (Step 520). In some embodiments, the sensor units 101 may have a prioritization protocol to ensure that specific sensor units are able to connect to the base station 205 and that the base station does not fail due to an overload of requests. The sensor units 101 may also determine that they have access to secondary access nodes (such as, for example, another wireless router in a neighboring building) to which the sensor units can transmit if the base station 205 is destroyed or overwhelmed by data requests. Different embodiments may attempt to strike different balances in how great a data sampling rate is needed versus the limited bandwidth available and the risk of essentially performing a denial-of-service attack on the base station 205.

In additional to data derived from the sensor modules 301 themselves, the sensor units 101 preferably transmit a unique identifier indicating which sensor is reporting the data, a timestamp indicating when the sensor data was generated, and optionally a signal indicating that one or more sensor modules 301 is malfunctioning or has been destroyed by damage to the sensor unit.

Figure 7C:
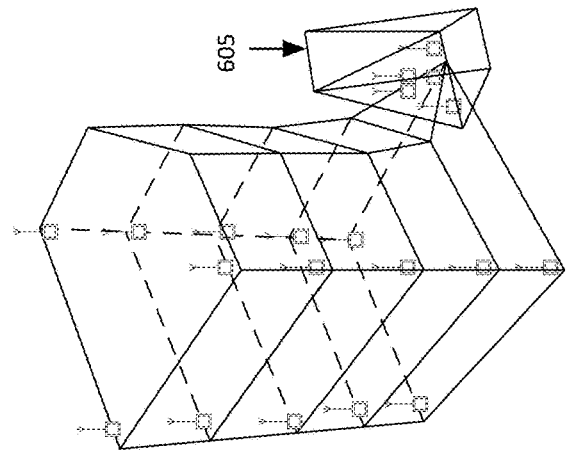
FIGS. 7A-7C illustrate, in simplified form, more detailed example visualizations that can be generated from the same snapshots used for the visualizations of FIGS. 6A-6C.
Figure 7B:
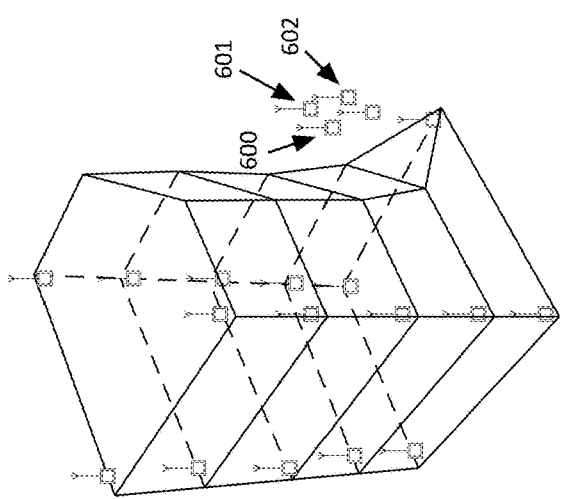
Figure 7A:
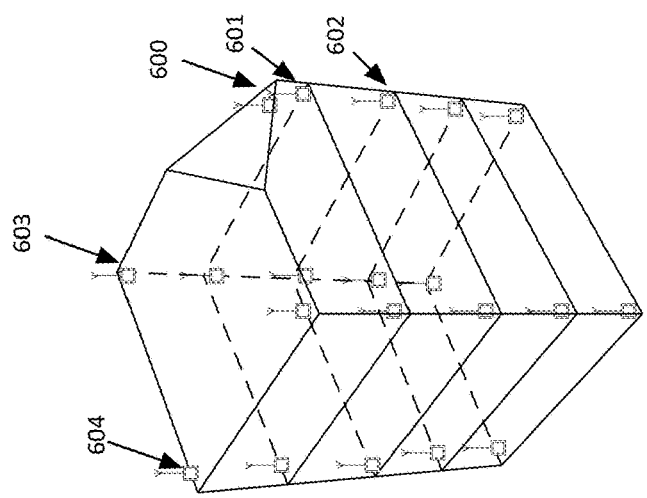

Data regarding the current state of sensor units 101 and all recorded data is received by sensor analysis device 215 via network 200 and analyzed to establish a four-dimensional model including the historical sensor data and, if possible, current sensor data (Step 525). The four-dimensional model may include a number of snapshots of sensor data at moments in time, such as (but not limited to) the position, acceleration, orientation, temperature, or other environmental information (including moisture, air quality, sound level, or light level). Although the raw data may only allow the sensor analysis device to generate a visualization of the sensor units' positions in space or other sensor values at a given moment in time, as illustrated in FIGS. 6A-6C, below, the data may be cross-referenced with architectural data, such as a blueprint of the structure 100, to generate a visualization of the collapse of the building, as illustrated in FIGS. 7A-7C, below.

In addition to the three-dimensional information of position or acceleration at a moment in time, a visualization may comprise additional dimensions of data by using colors, numbers, letters, icons, or other notations. For example, a snapshot may comprise not only the position of each of a number of sensor units 101, but also color each sensor unit according to its temperature, and use danger icons or percentages next to each displayed sensor unit to indicate decreased oxygen levels at the locations of sensor units. Accordingly, a snapshot may allow firefighters about to enter a building 100 to know exactly where to go and what equipment may be needed in a given area.

The four-dimensional model may take the form of a generated video file of the collapse as viewed from one or more particular vantage points, or may take the form of a series of snapshots at different moments in time throughout the collapse, or may be a data file suitable for a modeling or computer-aided design application, to allow a viewer to explore a three dimensional model from any angle and to advance the model through time to view the collapse or compare one moment with a previous moment.

The four-dimensional model, or one or more three-dimensional snapshots from the model, or a three-dimensional snapshot representing the current state of the structure 100, may be transmitted to an interested party (e.g., rescuers/first responders, salvagers, researchers, architects, engineers, construction companies, insurance adjusters, insurers, law enforcement, etc.) (Step 530). The sensor analysis device 215 may have a preconfigured list of identifiers or addresses of user computing devices 220 to which the information should be sent (e.g., mobile phone numbers, email addresses, fax machine numbers, internet protocol addresses, ethernet addresses, etc.). Alternatively, an operator of the sensor analysis device 215 may enter an identifier for an interested party and cause data to be transmitted to that party, or may save data to a non-transitory storage medium such as a solid state drive or optical disk for delivery to the party.

Any number of people may be interested in the data both for its explanatory power regarding the moment of the collapse and its predictive power for future collapses in similar structures. For example, first responders/rescuers may wish to analyze the four-dimensional model to determine likely locations of survivors under rubble (based on the movement of inhabited rooms during the collapse or data about movement or sound currently detected within the rubble), potential hazards to rescuers (e.g., gas leaks, intense heat, unstable rubble, etc.), and to help formulate an overall plan for the best way to begin rescue operations. Salvagers may wish to analyze the four-dimensional model to determine the likely locations of valuable items or materials (e.g., safes, copper or other valuable building materials, jewels or other valuable property known to have been in the building at the time of the collapse, etc.) or to determine a best plan for salvaging or clearing away debris. A construction company may wish to analyze the four-dimensional model to determine what work will be necessary to restore a damaged structure to its pre-damage state and to provide an estimated cost for the work. The construction company that built the structure may wish to analyze the four-dimensional model to determine how to better construct structure in the future or to avoid liability in a negligence lawsuit over the construction. An insurance adjuster may wish to analyze the four-dimensional model to determine the likely costs of repairing a partial collapse or other substantial but reparable damage.

An architect or engineer may wish to analyze the four-dimensional model to determine that one or more weaknesses in the structure's design made a collapse or other structural damage more likely, and to modify future designs to avoid any identified weaknesses. A researcher may wish to analyze the four-dimensional model to understand the theory of building collapse more generally and to educate persons building similar structures in the future. An actuary or insurance company may wish to analyze the four-dimensional model to determine the risks and costs associated with insuring structures and to better calibrate insurance rates for similar structures. Law enforcement may wish to analyze the four-dimensional model to reconstruct information regarding a suspected arson, terrorist attack, or other deliberate sabotage to the building, such as where a fire started, where a bomb was placed, or where the structural failure began.

Even after an initial collapse or other danger is complete, the data transmission and model generation (Steps 520, 525, and 530) may be repeated so long as some portion of the sensor units 101 survive and a means of receiving their current sensor readings exists. For example, first responders may receive updated data from the sensor units 101 showing how rescuers' efforts are causing rubble to shift, and may inform changes in the strategy of removing rubble to find persons who have been trapped underneath. Similarly, construction workers may receive updated data, informing a strategy for clearing away rubble to clear the structure site for rebuilding. The current data may also be used to identify any new dangers that may be occurring, such as a build-up of methane gas in buried rubble, or a fire that has started and needs to be addressed before rescue can safely continue.

FIGS. 6A-6C illustrate, in simplified form, example visualizations that can be generated from snapshots of the four-dimensional model according to the method illustrated in FIG. 5.

With reference now to FIG. 6A, a snapshot taken at the beginning of a catastrophic damage, such as that from an earthquake, may show that some sensor units (including, for example, sensor unit 600, shown with an arrow indicating velocity at that moment in time) began falling before others (for example, sensor units 601 and 602, which are at rest). Positions, orientations, velocity vectors, and acceleration vectors, along with any other desired sensor information, may be used to plot the status of sensor units at given moments in time. Even if position data is not directly available from the sensor modules of a given sensor unit, it may be calculated by integrating accelerometer data over time to determine a highly accurate estimate of the change in position from its initial value.

In FIG. 6B, a snapshot using data timestamped, for example, half a second after the previous snapshot, shows a full collapse of that part of the building 100 has begun, as each of the sensor units 600, 601, and 602 has moved from its original position or has a non-zero velocity.

In FIG. 6C, the data shows that the sensor units 600, 601 and 602 are all at rest, and that the collapse of the structure 100 has presumably come to an end.

FIGS. 7A-7C illustrate, in simplified form, more detailed example visualizations that can be generated from the same snapshots used for the visualizations of FIGS. 6A-6C.

With reference now to FIG. 7A, by combining known information about the significance of the locations of each sensor unit with the information about the position and velocity of each sensor unit from FIG. 6A, a visualization of the structure 100 collapsing can be generated.

For example, if information indicates that a floor separates sensor units 600 and 601 when the building is undamaged, a change in the position of one to approach the position of the other indicates that the floor between them has lost integrity (e.g., a crack or hole may have formed in the floor, allowing the sensor unit to fall through) or may have totally collapsed. However, since the position of other sensor units, such as sensor unit 603 and sensor unit 604, has not changed, the sensor analysis system 215 can infer that the floor has only partially collapsed, and estimate a fault line along which the floor has collapsed. As the number of sensor units increases and the density of their placement throughout a structure increases, a more detailed picture can be drawn from the data received.

In FIG. 7B, the additional movement of sensor units 601 and 602, as shown previously in FIG. 6B, can be used to infer that the entire structure is collapsing along that corner, and a projected visualization can be generated by the sensor analysis device 215. Similarly, in FIG. 7C, corresponding to FIG. 6C, the placement of the sensor units and the architectural data showing the number of floors in the building 100 may be used to estimate the current status of the structure and the spread of rubble 605 from the collapse.

Figure 8:
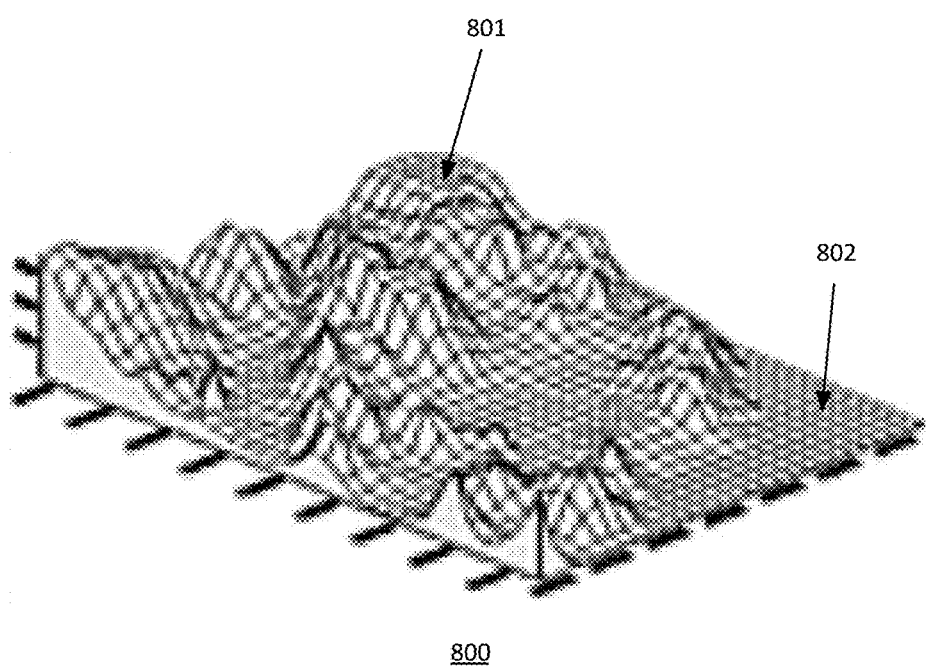
FIG. 8 illustrates, in simplified form, a visualization of a current state of a collapsed structure, generated according to the method illustrated in FIG. 5.

FIG. 8 illustrates, in simplified form, a visualization of a current state of a collapsed structure 100, generated according to the method illustrated in FIG. 5.

By compiling data from surviving sensor units, or extrapolating data from sensor units sent before their destruction, sensor analysis device 215 can predict the likely outcome of a collapse and generate, for example, a wireframe three-dimensional image 800 showing where rubble likely built up.

For example, the presence of multiple sensor units at increased elevation around point 801, or multiple sensor units whose velocities were converging on point 801 or were at rest at 801 before their destruction, or a sensor unit at point 801 reporting abnormally high pressure upon it, likely indicates a build-up of rubble around that location. In contrast, a lack of sensor units having reported moving towards point 802 or a sensor unit at that point that reports no pressure or the presence of light likely indicates that the area is free of rubble and clear for rescuers to use as a staging area.

As sensor data changes from surviving sensor units, updated wireframes similar to image 800 may be sent to first responders or construction workers.

Figure 9:
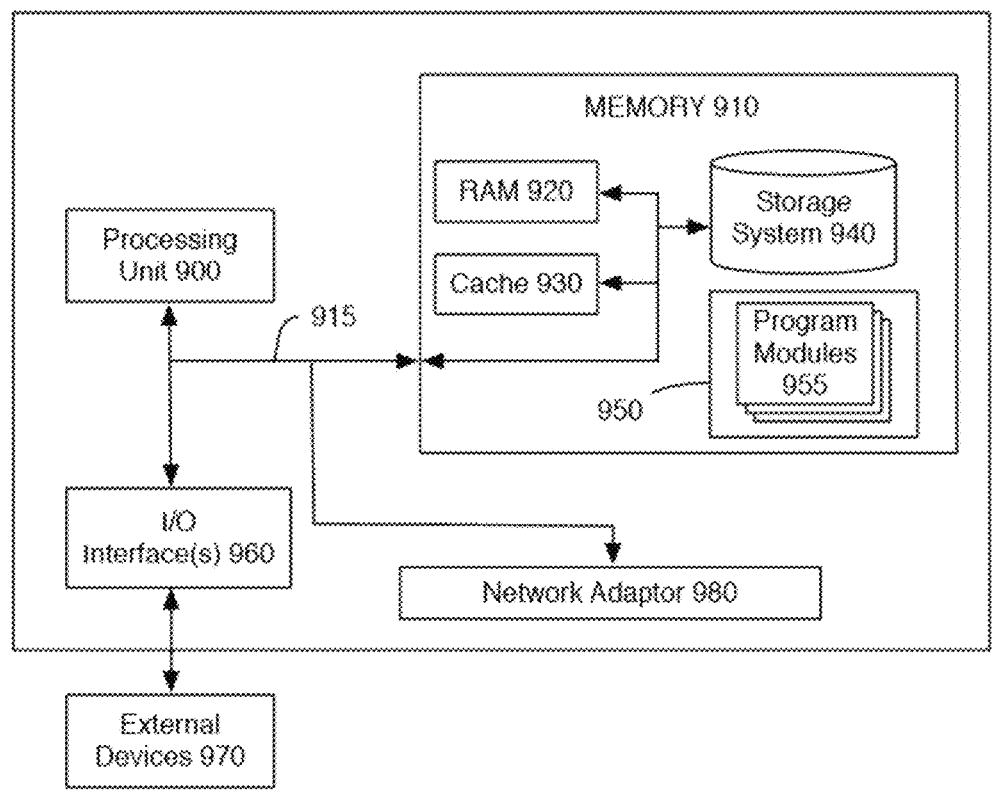
FIG. 9 is a block diagram of a representative computing device that may be utilized to implement various features and processes described herein.

FIG. 9 is a high-level block diagram of a representative computing device that may be utilized to implement various features and processes described herein, for example, the functionality of sensor unit 101, base unit 205, external communications device 210, sensor analysis device 215, or user devices 220. The computing device may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 9, the computing device is illustrated in the form of a special purpose computer system. The components of the computing device may include (but are not limited to) one or more processors or processing units 900, a system memory 910, and a bus 915 that couples various system components including memory 910 to processor 900.

Bus 915 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and proprietary Enterprise Service Bus (ESB) such as IBM® Integration Bus.

Processing unit(s) 900 may execute computer programs stored in memory 910. Any suitable programming language can be used to implement the routines of particular embodiments including C, C++, Java, assembly language, etc. Different programming techniques can be employed such as procedural or object oriented. The routines can execute on a single computing device or multiple computing devices. Further, multiple processors 900 may be used.

The computing device typically includes a variety of computer system readable media. Such media may be any available media that is accessible by the computing device, and it includes both volatile and non-volatile media, removable and non-removable media.

System memory 910 can include computer system readable media in the form of volatile memory, such as random access memory (RAM) 920 and/or cache memory 930. The computing device may further include other removable/non-removable, volatile/non-volatile computer system storage media. By way of example only, storage system 940 can be provided for reading from and writing to a non-removable, non-volatile magnetic media (not shown and typically referred to as a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 915 by one or more data media interfaces. As will be further depicted and described below, memory 910 may include at least one program product having a set (e.g., at least one) of program modules that are configured to carry out the functions of embodiments described in this disclosure.

Program/utility 950, having a set (at least one) of program modules 955, may be stored in memory 910 by way of example, and not limitation, as well as an operating system, one or more application software, other program modules, and program data. Each of the operating system, one or more application programs, other program modules, and program data or some combination thereof, may include an implementation of a networking environment.

The computing device may also communicate with one or more external devices 970 such as a keyboard, a pointing device, a display, etc.; one or more devices that enable a user to interact with the computing device; and/or any devices (e.g., network card, modem, etc.) that enable the computing device to communicate with one or more other computing devices. Such communication can occur via Input/Output (I/O) interface(s) 960.

In addition, as described above, the computing device can communicate with one or more networks, such as a local area network (LAN), a general wide area network (WAN) and/or a public network (e.g., the Internet) via network adaptor 980. As depicted, network adaptor 980 communicates with other components of the computing device via bus 915. It should be understood that although not shown, other hardware and/or software components could be used in conjunction with the computing device. Examples include (but are not limited to) microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may use copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages including (but not limited to) Java®, Perl™, Python® and JavaScript®. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
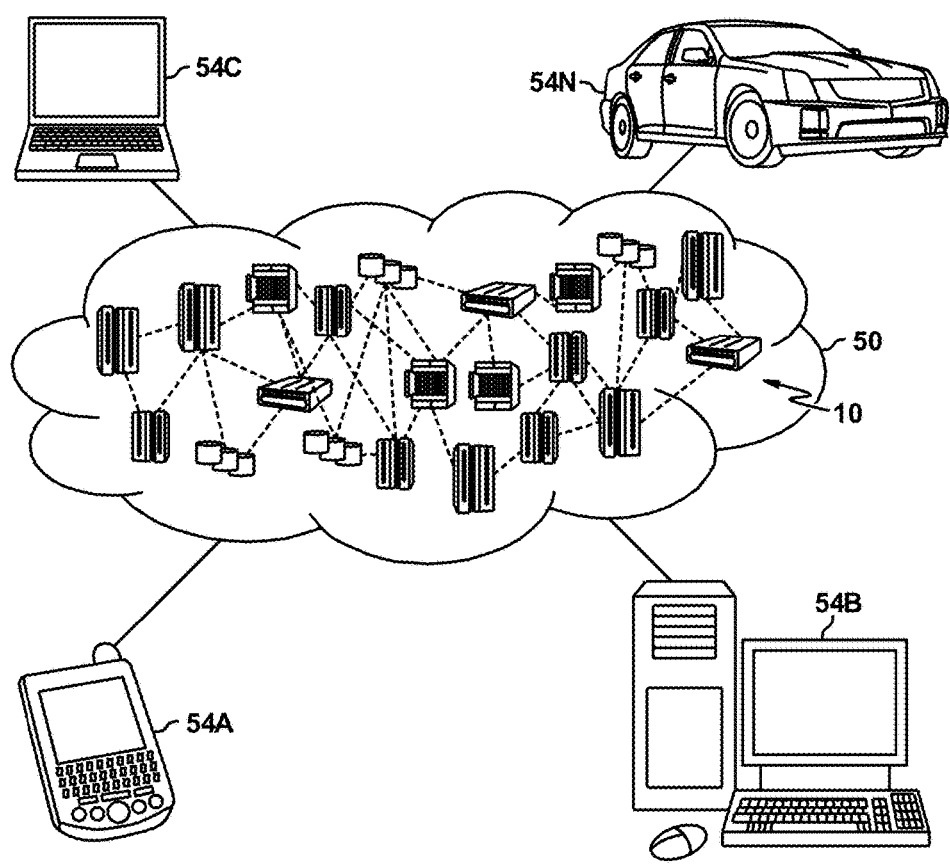
FIG. 10 depicts a cloud computing environment according to an embodiment of the present invention.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
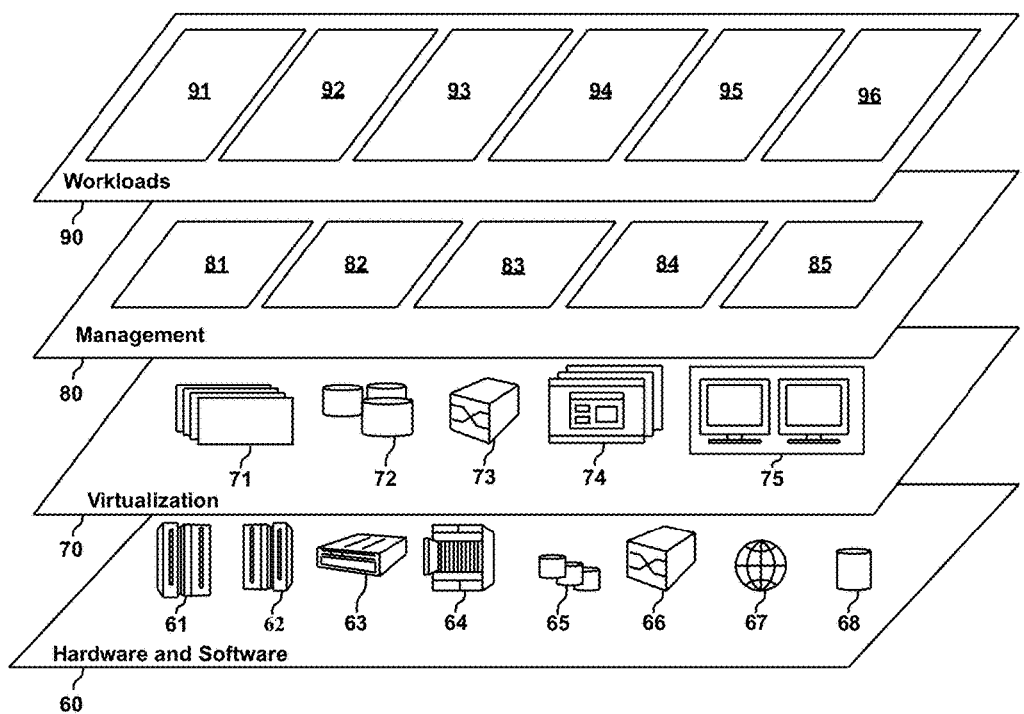
FIG. 11 depicts abstraction model layers according to an embodiment of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and sensor analysis system 96.

The sensor analysis system 96 may accordingly use any of the deployment or service models described to receive sensor data and transmit generated models to computing devices used by first responders or other interested parties, according to the methods previously described.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a wireless network hub;
   one or more sensor units coupled to the wireless network hub and affixed to a structure, the one or more sensor units configured to:
   wirelessly transmit data to the wireless network hub at a first time frequency; and
   in response to a detected danger to the structure, wirelessly transmit sensor readings to the wireless network hub at a second time frequency greater than the first time frequency; and
   a sensor analysis system configured to:
   receive location data concerning the structure;
   receive, from the one or more sensor units and via the wireless network hub, the wirelessly transmitted sensor readings; and
   generate a three-dimensional model of the structure based at least in part on the location data and the sensor readings.

2. The system of claim 1, wherein the one or more sensor units each comprise an accelerometer, and the sensor readings comprise an acceleration of a sensor unit.

3. The system of claim 1, wherein the one or more sensor units each comprise a thermometer, and the sensor readings comprise a temperature of a sensor unit.

4. The system of claim 1, wherein the detected danger to the structure is detected by a first sensor unit of the one or more sensor units and a notification of the detected danger is transmitted from the first sensor unit to a second sensor unit of the one or more sensor units.

5. The system of claim 1, wherein a notification of the detected danger is received by the wireless network hub and forwarded to each of the one or more sensor units.

6. The system of claim 5, wherein the notification comprises a notification from an automated meteorological or seismographic service.

* * * * *